United States Patent
Jordil (10) Patent No.: US 10,508,899 B2
(45) Date of Patent: Dec. 17, 2019

(54) METHOD FOR GENERATING INFORMATION ABOUT A SENSOR CHAIN OF A COORDINATE MEASURING MACHINE (CMM)

(71) Applicant: HEXAGON TECHNOLOGY CENTER GMBH, Heerbrugg (CH)

(72) Inventor: Pascal Jordil, Ecoteaux (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 190 days.

(21) Appl. No.: 14/680,933

(22) Filed: Apr. 7, 2015

(65) Prior Publication Data

US 2015/0285616 A1 Oct. 8, 2015

(30) Foreign Application Priority Data

Apr. 8, 2014 (EP) .................................... 14163929

(51) Int. Cl.
*H04N 7/18* (2006.01)
*G01B 11/00* (2006.01)
*G06K 9/52* (2006.01)
(52) U.S. Cl.
CPC .............. *G01B 11/005* (2013.01); *G06K 9/52* (2013.01); *H04N 7/18* (2013.01)
(58) Field of Classification Search
CPC ...... G01B 11/005; G01B 21/047; H04N 7/18; G06K 9/52; G06T 7/73
See application file for complete search history.

(56) References Cited

U.S. PATENT DOCUMENTS

| 5,825,666 A | 10/1998 | Freifeld |
| 8,543,237 B2 | 9/2013 | Slettemoen et al. |
| 8,825,438 B2 * | 9/2014 | Anderson .............. G01B 21/04 702/150 |

(Continued)

FOREIGN PATENT DOCUMENTS

| CN | 101842188 A | 9/2010 |
| EP | 0 916 923 A2 | 5/1999 |

(Continued)

OTHER PUBLICATIONS

European Search Report dated Jun. 25, 2014 as received in Application No. 14 16 3929.

*Primary Examiner* — Richard T Torrente
(74) *Attorney, Agent, or Firm* — Maschoff Brennan (57) ABSTRACT

A method for providing information about a sensor chain of a coordinate measuring machine is disclosed. The coordinate measuring machine may include a drive mechanism for moving a tool carrier relative to a base for approaching a measurement point. The CMM also may also include a sensor chain carried by the tool carrier and an arrangement of sensor chain components providing a particular sensor configuration for measuring the measurement point, and a camera for providing an image of at least a part of the sensor chain. The method may include capturing an image of at least a part of the sensor chain, deriving at least one sensor chain property from the image by image processing, comparing the sensor chain property with reference data which relates to a set of known sensor chain components and providing an output relating to the comparison of the sensor chain property with the reference data.

22 Claims, 3 Drawing Sheets

(56) References Cited

U.S. PATENT DOCUMENTS

| | | | |
|---|---|---|---|
| 2005/0226532 A1* | 10/2005 | Thompson | G06T 7/60 382/286 |
| 2006/0122804 A1* | 6/2006 | Chang | G01B 21/04 702/127 |
| 2008/0239327 A1* | 10/2008 | Bryll | G01B 21/042 356/623 |
| 2011/0134113 A1* | 6/2011 | Ma | A61B 8/4245 345/419 |
| 2011/0264402 A1* | 10/2011 | Anderson | G01B 21/04 702/150 |
| 2012/0246953 A1* | 10/2012 | Engel | G01B 21/045 33/502 |
| 2014/0163736 A1* | 6/2014 | Azizian | A61B 6/102 700/259 |
| 2014/0286536 A1* | 9/2014 | Pettersson | G01C 15/002 382/106 |
| 2016/0370172 A1* | 12/2016 | Christoph | G01B 5/012 |

FOREIGN PATENT DOCUMENTS

| | | |
|---|---|---|
| EP | 1 643 208 A2 | 4/2006 |
| WO | 2013/083730 A1 | 6/2013 |

\* cited by examiner

METHOD FOR GENERATING INFORMATION ABOUT A SENSOR CHAIN OF A COORDINATE MEASURING MACHINE (CMM)

FIELD OF THE INVENTION

The present invention generally pertains to a method for gathering information about a sensor configuration of a coordinate measuring machine (CMM) by help of a camera and a database of reference data, wherein images of the sensor configuration are taken and processed.

BACKGROUND

It is common practice to inspect work pieces subsequent to production on a coordinate positioning apparatus, such as a coordinate measuring machine (CMM), in order to check for correctness of predefined object parameters, like dimensions and shape of the object.

In a conventional 3-D coordinate measurement machine, a tool carrier is supported for movement along three mutually perpendicular axes (in directions X, Y and Z). Thereby, the tool carrier can be guided to any arbitrary point in space of a measuring volume of the coordinate measuring machine and the object is measurable with a measurement sensor arrangement (sensor chain) carried by the tool carrier.

In a simple form of the machine a suitable transducer mounted parallel to each axis is able to determine the position of the tool carrier relative to a base of the machine and, therefore, to determine the coordinates of a measurement point on the object being approached by the sensor. For providing movability of the tool carrier (probe head) a typical coordinate measuring machine may comprise a frame structure on which the tool carrier is arranged and driving means for moving frame components of the frame structure relative to each other.

For measuring surface variations, both measurement principles based on use of tactile sensors and of optical sensors are known.

In general, to provide a coordinate measuring machine with high measurement precision, its frame structure is therefore usually designed to have a high static stiffness.

In order to achieve a stiff and rigid machine design, the frame structure or at least parts of it, is often made of stone, such as granite.

For measuring an object automatically, a part program needs to be written in order to provide suitable guidance of the measuring probe according to the dimensions and the shape of the object. Such part program contains all necessary information about the object (work piece) and about the features to be measured. In addition, the sensor chain needs to be defined with the part program, i.e. what kind of measuring head, what kind of extension, what exact sensor and what stylus is to be added for fulfilling the given requirements of the measurement. Typically, some software tool help doing this selection in a more convenient way, but that operation generally stays a manual process.

Some general limitations are given with this process. When defining the sensor chain for the first time, the user has to select, particularly out of a very long list of items, which sensor elements are in use. This can be quite challenging, as often the exact sensor name is not known or if local names for some of the components are used.

Furthermore, there is always the possibility given to forget to set e.g. a stylus extension or a further component of the sensor chain. Finally, an overall risk is that the sensor chain definition will not be correct, leading to unwished crashes.

In addition, when later on re-using a given part program, the user needs to ensure the right sensor chain, i.e. each component of the chain, which is mounted on the CMM. Such operation may generate corresponding errors as mentioned above. As a consequence, if the sensor chain is not correctly defined in the measuring software, the wrong dimensions will be used, usually generating collisions between the sensor elements and the work piece or the CMM structure.

An approach for overcoming the problem of manually defining the sensor chain is the use of a known electronic identification system. An identification chip in every sensor component and a serial identification bus connecting all components to a master unit are provided, wherein each component which is attached is listed and thus the sensor chain is definable.

Disadvantageously, there however is no standard for that technology and only a few sensor components are equipped with such an electronic identification chip. In any case, a stylus never could be equipped with some electronics, what exclude them from such a system. Moreover, already existing sensor components without an electronic identification chip may not be provided with such chip and thus cannot be considered. Consequently, that quite complex electronic solution is expensive, is not standardized and cannot cover the complete sensor chain or sensor components without a chip.

SUMMARY

Some embodiments of the present invention provide an improved method for identification of the sensor chain of a coordinate measuring machine, wherein the identification is executable mainly automatically, particularly without need of manual input of a user.

Some embodiments of the invention provide identification, wherein the identification is comparatively cheap, i.e. the equipment needed for identifying the sensor chain, compatible to basically every sensor component and the execution of the process as a whole is comparatively little time consuming.

Some embodiments of the invention provide an automated and reliable sensor identification procedure, which provides for precise and also reliable measurement of an object.

The invention relates to a method for providing information about a sensor chain of a coordinate measuring machine. The coordinate measuring machine at least comprises a drive mechanism for moving a tool carrier relative to a base for approaching a measurement point. The coordinate measuring furthermore comprises the sensor chain which is carried by the tool carrier and which comprises an arrangement of sensor chain components providing a particular sensor configuration for measuring the measurement point, and a camera particularly for providing an image of at least a part of the sensor chain.

According to the invention, an image of at least a part of the sensor chain is captured with the camera and at least one sensor chain property is derived from the image by image processing. Moreover, the sensor chain property is compared with (particularly pre-known) reference data which relates to a set of known sensor chain components and an output is provided relating to the comparison of the sensor chain property with the reference data.

Particularly, the method—i.e. each single step of the method—is performed in an automated manner and thus provides for automatically deriving of information about the sensor chain.

Therefore, one or more cameras must be placed on the CMM to be able to take one or more pictures of the installed sensor chain. Such camera could be placed on the bridge, on the top of the legs or anywhere along the legs for taking pictures from the side, on the table (base), on the carriage and/or on the Z-ram. In general the camera could be placed at any place of the structure of the CMM.

The field of view of the camera particularly can be adapted depending on the chosen camera location and a respective position of the tool carrier. In some cases, the field of view could cover the entire measuring volume in order to recognise the sensor chain without any movement of the CMM or adaptation of an alignment of the camera. For bigger machines or for a more detailed recognition, only a portion of the measuring volume would be seen, needing then movements of the CMM to bring the sensor chain in the field of view of the camera. For example, if the camera is located at a leg of the portal, looking horizontally with a limited field of view, it may be necessary to move the Z-ram to the top and in the middle of the bridge to have a chance to correctly see the sensor chain with the camera.

In order to identify the used sensor chain on a CMM and/or in order to ensure the right sensor chain is mounted on a CMM to run a specific part program, one or more cameras can take one or more pictures of at least a part of the mounted sensor chain.

This picture information can be used together with a database—containing an amount of possible and known sensor types—and an image recognition tool to identify respective sensor components arranged with the sensor chain. The identification is computer driven, wherein first a comparison of features of the captured image with reference sensor data, e.g. reference images of known sensor components or dimensional information which is associated to such known components, is performed and based on that comparison an output, particularly comprising information about which sensor component is present, is provided.

The reference data base can be stored locally, but also could be provided online, what would bring the advantage to always have up-to-date reference information. A local copy of an on-line reference database also surely can be used.

The method according to the invention provides a number of advantages. Regarding the generation of part programs, an operator of the CMM does not need to know all names of the used sensor components. In addition, a part program is generated faster. Moreover, as the identification of the sensor chain can be performed fully automated, there is no longer the risk to enter wrong items, generating wrong information that would lead to collisions. Furthermore, the method allows a not well-trained user to easier use the CMM.

With respect to re-using written part programs, advantageously, the method provides to automatically ensure that the right (desired) sensor components (sensor configuration) are mounted on the CMM and thus helps to avoid any collision during measuring operations of the CMM. Moreover, the method provides to advise the user (by providing respective information), if the sensor chain is not the correct one. In addition, by use of the method it can be detected if e.g. the stylus is twisted or broken.

According to a specific embodiment of the invention, at least one of the sensor chain components is identified by comparing the sensor chain property with the reference data; particularly the entire sensor chain is identified. Thus, the reference data comprises information of how a respective sensor component is related to a sensor chain property and thus provides for comparison of the image-derived sensor chain property with the reference data so that the sensor component is identified. The reference data e.g. comprises data of shapes of known sensor component, wherein such shape data may be processed with a captured image and a sensor component is identified based on the match of the shape data with given image features.

Particularly, the information about the identified at least one sensor chain component is used for setting up a part program to be run in order to measure an object. After having identified one of the sensor components (e.g. the stylus) or the entire sensor chain, that information is provided for configuration of a part program, i.e. a program defining a measuring path for a defined object to be measured. If the object is known (or the type, dimension and/or shape of the object is derived based on a set of images taken of the object) a path along which the probe (sensor chain) is to be guided for measuring the surface of the object can automatically be derived. Measuring the object then can be performed by applying (executing) the created part program.

Referring to a further aspect of the invention, a user or operator of a coordinate measuring machine (CMM), which provides a method according to the invention, is enabled to receive additional information with view to measuring a work piece. Therefore, a user information which provides information about at least one of the sensor chain component determined by the comparison of the sensor chain property with the reference data can be generated, particularly a type and state of the sensor chain component, and the user information is put out for guidance of the operator of the coordinate measuring machine, particularly wherein the user information is displayed on display means.

Thus, the operator is automatically provided with some information about the state of the measuring machine, i.e. for instance if respective machine components are correctly fixed and if some component may be broken or not, and about the sensor configuration being actually mounted at the probe head (tool carrier)—e.g. if a sensor configuration suitable to a specific part program is mounted.

In such context, according to another specific embodiment of the invention, the output is provided dependent on a match of the at least one derived sensor chain property with a measurement requirement given by a selected measuring program (part program). Particularly, a warning message or a signal is provided if the attached sensor chain does not fit to the selected measuring program.

The method according to the invention furthermore may comprise a function for monitoring or identifying an object to be measured. Therefore, a further image may be captured with the camera covering at least a part of a measuring volume within which the object to be measured is mountable, wherein object information is derived based on the captured further image and the object information is provided for checking presence of the object and/or identifying the object. In particular, the position and/or orientation of the object with reference to the measuring volume are determined, wherein dimensions of the object and/or an object type are determined.

Regarding a particular embodiment of the invention, a 3D reconstruction of the object can be used to be compared with given CAD-data, the 3D reconstruction being derived from the object information, e.g. by use of a specific algorithm. By that, the object to be measured can be identified by comparing reconstructed 3D data with given CAD-data.

Consequently, not only information about the sensor chain but also relating to the object can be derived by use of the at least one camera mounted at the CMM.

According to a specific embodiment of the invention, the object information is used for controlling, particularly adapting, a measuring process, wherein a movement of the sensor chain is controlled so that a collision of the sensor chain with the object is prevented and/or a measuring path is adapted based on the object information. The object information may be used for adapting or creating the part program to be run for measuring a defined object.

A further aspect of the invention is to additionally monitor given or changing measuring conditions. For that, an image signal may continuously be provided by the camera representing image information according to the field of view of the camera, wherein the image signal is continuously processed regarding possible changes concerning the image information. Such processing particularly provides for determining motions in the field of view and for controlling the measuring process dependent on the determined motions. This enables to immediately react on possible (occurring) obstacles and thus to prevent from collisions.

According to a further embodiment of the invention, the sensor chain property provides dimensional sensor information of the at least one covered part of the sensor chain (e.g. the stylus), wherein the dimensional sensor information is derived at least by use of calibration parameters of the camera. Thus, if respective calibration of the used camera is given and particularly (in case the camera does not provide a kind of distance measuring functionality like a RIM-camera) if the relative position and/or orientation of the camera and the sensor chain are known (which can be derived from the controlling parameters for the tool carrier, i.e. an actual position of the carrier and orientation of the probe, wherein the position of the camera at the CMM is known), e.g. a length of the stylus or a diameter of the measuring tip can be derived from the captured image. Here, for instance, each pixel of the captured image is associated to a respective dimensional value due to the calibration of the camera, with considering the distance between camera and the respective sensor chain component.

The above procedure can also provide for directly measuring the stylus tip position e.g. if an identification of the entire sensor chain based on a captured image fails.

In addition, by positioning a supporting probe head (having two axes of rotation) at different angles and capturing the attached stylus, a rough kinematical model of the used sensor configuration (including the two rotation axis of the supporting probe head) also automatically can be extracted.

Generally the stored reference data contains information which allows assigning a particular image feature to a known sensor component. Regarding the reference data more specifically, according to a further embodiment of the invention, the reference data comprises reference images of the known sensor chain components and/or codes and/or patterns referencing known sensor chain components and/or information about at least one known sensor chain component, the information at least representing a type and/or dimensional reference information of the known sensor chain component.

The reference data may be stored in a storage medium of the CMM or of a remote controller of the CMM or may be provided on a server and accesses via internet.

The invention also relates to a coordinate measuring machine (CMM) for determining at least one spatial coordinate of a measurement point of an object to be measured. The coordinate measuring machine comprises a tool carrier being adapted to carry a sensor chain so that the sensor chain—in an attached state—is present within a sensor carrying zone with reference to the tool carrier, the sensor chain comprising an arrangement of sensor chain components providing a particular sensor configuration for measuring the measurement point. Furthermore, the CMM comprises a structure, to which the tool carrier is attached, the structure being movable in at least two directions, a drive mechanism for moving the tool carrier relative to a base for approaching the measurement point, a controlling and processing unit, and a camera for providing an image of at least a part of the sensor carrying zone.

According to the invention, the camera and the tool carrier are adapted to be positioned and/or oriented relative to each other so that the field of view to the camera at least partly overlaps with the sensor carrying zone. With other words, the camera and the tool carrier can be aligned so that if an image is taken with the camera and if a sensor component is attached at the tool carrier, at least a part of the attached sensor component is covered by the taken image. Particularly, a standard alignment and position of both units (camera and tool carrier) is defined into which the units are moved for taking such image.

Moreover, reference data relating to a set of known sensor chain components is provided in a database and the coordinate measuring machine provides a sensor identification functionality executable by the controlling and processing unit and at least defined by the following:
capturing an image of at least a part of the sensor carrying zone,
deriving at least one sensor chain property from the image of the part of the sensor carrying zone by image processing,
comparing the sensor chain property with the reference data and
providing an output relating to the comparison of the sensor chain property with the reference data.

The CMM with the sensor identification functionality thus can provide a check if a probe (sensor chain) really is present and if the sensor chain which is mounted on the probe head of the CMM fulfils a specific measuring requirement for measuring the object, e.g. if the correct type of stylus is mounted.

According to an embodiment of the invention, the camera is arranged at the structure or at the base of the coordinate measuring machine, particularly wherein the structure comprises a portal being moveable in a first direction with two portal legs and a bridge and a column (Z-ram) provided at the portal and being moveable in a second direction perpendicular to the first direction. According, to an alternative embodiment, the CMM comprises a so called "Delta Robot" (FIG. 4) as a supporting structure, wherein the sensor chain is attached to that robot and the camera e.g. being mounted on the robot.

Regarding the design of the camera, the camera may be equipped with a swivelling unit so that the field of view of the camera is adjustable by pivoting the camera around at least one axis which is defined by the swivelling unit. Moreover, the camera may comprise zoom optics for adjusting the size of the field of view. Particularly, the camera is embodied as an overview camera having a comparatively wide field of view.

Relating to a further embodiment of the invention, a second or more cameras are provided, wherein additional images each at least covering a part of the sensor carrying zone can be captured with the second or more cameras and the sensor identification functionality is configured so that the additional images are used for deriving the at least one sensor chain property.

According to a specific embodiment, the sensor identification functionality is configured so that a digital model is generated based on the first image and/or the second or more images, wherein the digital model is provided for identification of the at least one sensor chain component. An identification of the sensor chain or respective component thus could be more precise and reliable.

Moreover, the sensor identification functionality can be configured so that—depending on the derived sensor chain property (i.e. for instance if a part of a sensor chain component is covered by the image and the derived sensor chain property represents that part)—the relative position and/or orientation of the camera and the tool carrier are rearranged and another or more (additional) images are captured which are used for deriving the at least one sensor chain property, particularly wherein a kinematical model of the sensor chain is derived on basis of the captured images. Such rearrangement of the camera and the tool carrier is controlled by the controlling (and processing) unit.

By performing this (implemented) method, additional data regarding the sensor carrying zone, i.e. the sensor chain if attached, is gathered in form of additional images from other perspectives and such additional data is used for identification of the sensor chain and/or of its components. Thus, if no part of the chain is captured in a respectively captured image, the rearrangement can provide a new view of the camera so that a sensor component can be captured then.

Concerning a further embodiment of the invention, the sensor identification functionality is configured so that on execution by the controlling and processing unit a method a described above is performed.

The invention also relates to a computer programme product having computer-executable instructions implemented for performing the following steps according to a method a described above based on stored reference data and a received image:
deriving at least one sensor chain property from the image by image processing,
comparing the sensor chain property with the reference data and
generating an output relating to the comparison of the sensor chain property with the reference data,
in particular when run on a controlling and processing unit of a coordinate measuring machine according as described above.

BRIEF DESCRIPTION OF THE DRAWINGS

The method and the device according to the invention are described or explained in more detail below, purely by way of example, with reference to working examples shown schematically in the drawings. Specifically.

DETAILED DESCRIPTION

Figure 1:
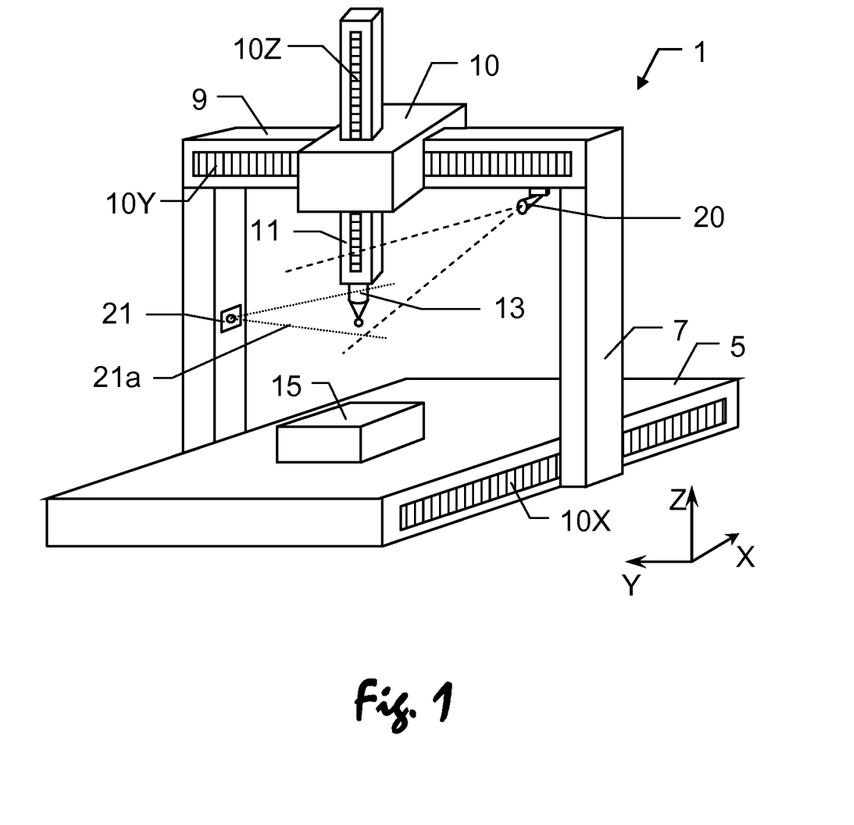
FIG. 1 shows an embodiment of a portal coordinate measuring machine with two cameras for capturing images of the sensor according to the invention.

FIG. 1 depicts an example embodiment of a portal coordinate measuring machine 1 (CMM) according to the invention, the coordinate measuring machine 1 comprises a base 5 and a frame structure for linking a probe head 13 to the base 5, the frame structure comprising several frame components 7, 9-11 being movable with respect to another. The first frame component 7 is a portal having two portal legs, which are connected by a bridging portion 9 at their upper ends. Driven by a drive mechanism (not shown), the frame component 7 is capable to move along the longitudinal sides of the base 5. This direction corresponds to a first direction X. The movement of the frame component 7 is performed by e.g. a gear rack attached to the base 5, which is meshing with a pinion on the frame component 7.

A second frame component 10 (carriage) is movably arranged on the bridging portion 9 of the frame. The movement of the second frame component 10 is also achieved e.g. by a rack and pinion. A vertical rod or column 11 (sleeve, Z-ram), building a third frame component, is movably incorporated into the second frame component 10. At the bottom portion of the vertical rod 11 a tool carrier 13 is provided. The vertical rod 11 is also movable e.g. via rack and pinion.

Thus, the tool carrier 13 is movable to any desired point in a measuring volume (work zone) of the coordinate measuring machine 1 in the directions X, Y and Z. The measuring volume is defined by the base 5 and the frame components 7,9,11. The three space directions X, Y and Z are preferably orthogonal to one another, although this is not necessary for the present invention.

It should be noted that a drive mechanism and a controller for driving the racks and pinions, and, thus, for driving the probe head 13 is not shown. Moreover, it should be noted that providing movability by a rack as mentioned above represents only one well known structural example for such movement mechanism. Such movement mechanism could be realised by a variety of other options known from prior art.

An object 15 to be measured is positioned in the space of the measuring volume on the base 5.

The tool carrier 13, on which a stylus (being one part of an entire sensor chain) is arranged exemplarily, is fastened on the lower free end of the rod 11. The stylus is used in a manner known per se for touching the object 15 to be measured. However, the present invention is not restricted to a tactile coordinate measuring machine and may likewise be used for coordinate measuring machines in which a measurement point is approached in a non-contact manner, i.e. for example a coordinate measuring machine with an optical scanning head. More generally, the tool carrier 13 may be designed for arranging a contact probe, e.g. a scanning or touch trigger probe, or a non-contact probe, particularly an optical, capacitance or inductance probe.

As mentioned above, the stylus represents one component of a sensor chain, the sensor chain being carried by the tool carrier 13. Typically, the sensor chain comprises a measuring head, a kind of extension, a sensor unit and a particular type of stylus. A plurality of particular different types for each of those components is available to be arranged with the sensor chain, so that a large variety concerning the composition of the sensor chain is given. Consequently, on the one side it could be difficult to choose a suitable sensor chain for a particular measuring task and on the other side an operator of the CMM has to carefully select proper components in order to meet requirements given by a part program (which is set for measuring a designated object).

Moreover, the operator has to tell the system which specific components are used for a measuring program to be run. With view to that, due to the plurality of sensors to be chosen, the operator has to be well trained on the system (and sensor components) to be sure to set those parameters which correspond to respective sensor components attached with the sensor chain.

Referring to attaching the sensor chain at the tool carrier 13, there is a defined spatial area (sensor carrying zone) within which the sensor chain would be present when carried by the tool carrier 13. With other words, the tool carrier 13 defines—according to its design and sensor mounting unit—such area inside of which the sensor chain would be provided (if attached). Of course, the location and orientation of such sensor zone changes due to a respective movement of the tool carrier 13 (and the possibly attached sensor chain).

Regarding the above combinations of sensor components, the present invention provides for an easier and safer handling of the sensor chain and for a more reliable performance of measuring tasks concerning a respective sensor configuration, which is required or conveniently to be chosen.

Two of the most common types of bearings between the movable members and the guides are air bearings or mechanical bearings (e.g. linear circulating plus rails). The air bearings give the advantage that there is no friction in the movement (which may introduce different kind of errors like angle errors or hysteresis). The disadvantage of air bearings is that the stiffness is lower than in mechanical bearings, so that particularly dynamic errors may occur. In mechanical types, the stiffness in the bearing system is typically higher but there is friction and the friction forces may introduce errors. However, the invention may be applied for both types of bearings. Summed up, the coordinate measuring machine 1 is built for determination of three space coordinates of a measurement point on an object 15 to be measured and, therefore, comprises three linear drive mechanisms for provision of movability of the tool carrier 13 relative to the base 5 in the first, second and third direction (X, Y and Z direction).

Each linear drive mechanism has a linear guide, one in the first, one in the second and one in the third direction (X, Y and Z direction), respectively. In a simple embodiment, the linear guide of the X-direction drive mechanism is formed by two edge-building surfaces of the base 5, the linear guide of the Y-direction drive mechanism is formed by two or three surfaces of the bridge and the linear guide of the Z-direction drive mechanism is formed by a cubical hole in the Y-carriage member 10.

Furthermore, each linear drive mechanism comprises a movable member being supported for movement along the guide by bearings. In particular, the movable member of the X-direction drive mechanism is embodied as X-carriage having mutually facing surfaces with respect to the above mentioned two guiding surfaces of the base 5. The movable member of the Y-direction drive mechanism is embodied as Y-carriage having mutually facing surfaces with respect to the above mentioned two or three guiding surfaces of the bridge. And, the movable member of the Z-direction drive mechanism is formed by Z-column 11 (sleeve) having mutually facing surfaces with respect to the inner surfaces of the cubical hole in the Y-carriage 10.

Moreover, each linear drive mechanism comprises a linear measuring instrument for determination of a first, a second or a third drive position, respectively, of each movable member in the first, the second or the third direction (X, Y and Z direction), respectively.

In this example embodiment of FIG. 1, the portal legs 7 each have a movable X-carriage which allows movement of the first frame component in X-direction.

A measuring scale 10X being part of the X-measuring instrument is schematically represented on the long side of the base 5, wherein the scale 10X extends parallel to the X-direction. The scale may be a glass measuring scale, e.g. having incremental or absolute coding, with which a drive position in the X-direction of the X-carriage can be determined. It is to be understood that the measuring instrument may furthermore contain suitable sensors for reading the measuring scale 10X, although for the sake of simplicity these are not represented here. However, it should be pointed out that the invention is not restricted to the use of glass measuring scales, and therefore may also be used with other measuring instruments for recording the drive/travelling-positions of the movable members of the drive mechanisms.

Another measuring scale 10Y is arranged parallel to the Y-direction on the bridging portion 9 of the frame. Finally, another measuring scale 10Z is also arranged parallel to the Z-direction on the Z-column 11. By means of the measuring scales 10Y, 10Z as part of the linear measuring instruments, it is possible to record the present drive positions of the carriage 10 in Y-direction and of the sleeve 11 in the Z-direction metrologically in a manner which is known per se.

Not shown is a controlling and processing unit, which is designed to actuate the motor drives of the coordinate measuring machine 1 so that the tool carrier 13 travels to the measurement point. The controlling and processing unit comprises a processor and a memory. In particular, the controlling and processing unit is designed for determining the three space-coordinates of the measurement point on the object 15 as a function of at least the first, the second and the third drive position of the three drive mechanisms.

For manual operation, the control unit may be connected to a user console. It is also possible for the control unit to fully automatically approach and measure measurement points of the object 15 to be measured.

Because the design of coordinate measuring machines of the generic kind as well as the design of different linear guides and different linear measuring instruments are well known to skilled persons, it must be understood that numerous modifications and combinations of different features can be made. All of these modifications lie within the scope of the invention.

Moreover, the coordinate measuring machine 1 comprises a first camera 20 and a second camera 21, in particular being built as optical cameras for capturing images of the sensor chain.

The first camera 20 is arranged on the frame component 9 and, therefore, being positionable by moving the bridge 9 along the X-axis. According to the present embodiment, the camera comprises a camera base and a camera objective, the objective being swivelable relatively to the camera base and, thus, providing additional alignment axis. However, the present invention is not restricted to the use of cameras being enabled for aligning their capturing directions and may likewise be used with other camera types for capturing images according to their arrangement at the CMM.

The second camera 21 is integrated in one of the portal legs so that the field of view 21a of the second camera 21 is fixed with reference to the portal 7.

According to the invention, the coordinate measuring machine 1 provides functionality for identifying at least a part of the sensor chain, i.e. at least one of the sensor components arranged with the sensor chain. Such functionality preferably is executable by the controlling and processing unit of the CMM 1 or by an alternative (e.g. external) processing unit.

The functionality is defined by capturing an image of at least a part of the sensor chain (sensor carrying zone) with at least one of the cameras 20,21. By that, at least a part of a sensor chain—if at least one component of such chain is attached at the tool carrier 13 as shown—can be covered and appears in the image. Based on the captured image a sensor chain property is derived from the image by image processing. Such sensor chain property can be represented e.g. by a dimensional value, by a shape or by a code or marking of a respective sensor component.

Furthermore, the sensor chain property is compared with reference data referencing and particularly representing a set of known or available sensor chain components. The reference data may be in form of a table which enables to assign particular sensor components according to a code being attached to the component and recognised as a respective sensor chain property. Alternatively or additionally, the reference data is kind of image data providing image related information about at least one sensor component and providing a comparison of the derived sensor chain property with that image data e.g. by comparing the captured image with respective reference images of known sensor components.

Based on above comparison, output information is generated and provided to a measuring system (CMM) and/or to an operator.

Such output information may contain information about what kind or type of sensor component is provided at the tool carrier 13 and particularly about if any sensor component is attached at the tool carrier 13. In particular, the entire sensor chain is identified, i.e. each sensor component of the chain is identified based on the captured image and its comparison with reference data.

The identification of the sensor chain particularly is performed before (precisely) measuring the object 15 in order to e.g. check if the identified sensor configuration represents a configuration which is required for measuring the object 15. For instance, a part program to be run for measuring the object 15 requires a designated sensor chain and the functionality for identifying the sensor chain is performed in advance of starting the measuring process for verifying if a correct (suitable) sensor configuration is in use.

For providing this feature particularly the camera 20 is aligned so that at least a first image of at least a first part of the sensor chain is capturable by the camera 20 and the at least first image is captured then.

Alternatively or additionally, the tool carrier 13 is aligned and positioned so that a second image is capturable with the second camera 21 covering at least a part of the sensor carrying zone as well.

Surface data may be derived from the at least first and/or second image by image processing, wherein the surface data represents a surface profile according to a content of the at least first part of the sensor carrying zone (i.e. a surface of a potentially present sensor component). On basis of the gathered surface data a sensor chain property is derived and is compared to reference data providing the identification of sensor components. Such sensor chain property or the information about the sensor components may then be provided for a subsequent execution of the precise measurement of the object 15.

In addition to identifying the attached sensor configuration, the object 15 on the base 5 may be identified as well. As the cameras 20,21 are moveable along the X-axis and camera 20 is alignabel according to its pivotability, additional images of the measuring volume, e.g. of additional parts of the measuring volume, may be captured and considered for deriving further surface data of the object 15. Such images of the object 15 are then being compared to respective data representing known objects. The object 13 located on the base 5 can be identified on the basis of the object reference data and the additionally captured image of the object 15.

Above described functionalities provide an improved user-friendliness for coordinate measuring machines as with starting the functionalities the sensor at the tool carrier is automatically identified and an automated scan of the measuring volume may be performed and the object 15 on the base 5 may be determined (checking for the presence of the object 15, respectively).

Furthermore, a measuring program for measuring the object 15 may be chosen or generated according to the present sensor configuration and the object 15 is measured automatically according to that program.

Figure 2:
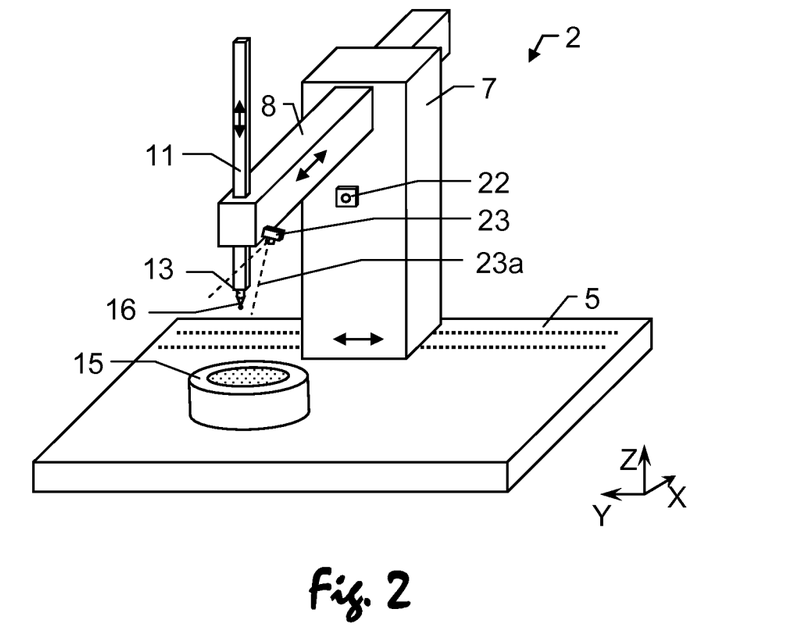
FIG. 2 shows a further embodiment of a coordinate measuring machine with cameras according to the invention.

FIG. 2 shows a further example embodiment of a coordinate measuring machine 2 (CMM) according to the invention, the coordinate measuring machine 2 comprising a base 5 and the frame components 7,8,11 for providing movability of the tool carrier 13 in three directions (X-, Y- and Z-direction) relative to the base 5. Furthermore, the frame components 7,8,11 are moveable relative to each other by drive mechanisms (not shown) linking the three frame components 7,8,11 and the base 5.

An object 15 to be measured is placed on the base 5. For measuring this object 15 a sensor configuration 16 carried by the tool carrier 13 is approached to the surface of the object 15. Coordinates are determined according to a predefined measuring path on which a tactile measuring sensor 16 at the tool carrier 13 is guided and the surface profile of the object 15 is determined depending on that measurement.

According to the invention, particularly in advance of determining the surface of the object 15, a sensor determination functionality is executed using the cameras 22,23 arranged at the frame structure of the coordinate measuring machine 2. The cameras 22,23 may be built as simple overview cameras, e.g. webcams, or as RIM-cameras (additionally providing distance information for pixels of an image) moveable by moving respective frame components 7,8 the cameras 22,23 are arranged at.

In context of the sensor determination functionality at least one image is captured with one or both of the cameras 22,23 covering at least a part of the sensor configuration 16 (the sensor carrying zone). A sensor chain property is extracted based on the image data, the sensor chain property representing at least partly the attached sensor configuration 16.

Reference data which is stored on a storage medium and provides data which enables to identify a sensor component at the tool carrier 13 is available. The sensor component can be identified based on the extracted property and by comparing the property to the stored reference data parameters. The reference data can preferably be stored on a server and be accessed via internet. Alternatively, the reference data is provided by the processing unit of the CMM 2 or by a remote control for controlling operations of the CMM 2.

Preferably, a defined relative position and orientation of the cameras 22,23 and the tool carrier 13 are defined so that if images are captured with the cameras 22,23 the tool carrying zone (=zone defined by the tool carrier 13 inside which the sensor configuration 16 is present in an attached state) is covered by the fields of view 23a of the cameras 22,23 at least partly. For performing the sensor determination functionality cameras 22,23 and tool carrier 13 are moveable as to be present in that relative position (and orientation).

Particularly, the sensor determination functionality is executed for checking if the sensor configuration 16, which is attached at the tool carrier 13, is suitable for performing a designated part program for the object 15. With other words, based on the functionality, there is a check if the present sensor configuration 16 fits the requirements which are defined by the part program.

Furthermore, by use of the sensor determination functionality respective sensor parameters (representing present sensor components) can be put into the system and thus enable to verify or to correct settings made by a user of the CMM 2.

In case the captured images do not show a part of the sensor configuration 16, the cameras may be relocated and further images are captured so that the sensor configuration 16 is detectable by image processing of the captured images. Such check (if the sensor configuration 16 is covered by the images) can be performed by image processing of the images, as well.

Moreover, a measuring path accounting to the identified sensor chain 16 can be chosen with reference to the object to be measured and controlling information is generated depending on the sensor chain 16, providing controlling data for measuring the surface of the object 15 by the measuring sensor at the probe head 13. The generated controlling data is then used for guiding the probe head 13 (and sensor chain 16) relative to the surface of the object 15 so that the measuring points on the object 15 are detectable with a defined point-to-point resolution.

According to a particular embodiment, in a first phase reference images (of the sensor chain 16 and/or the object 15) can be taken with the cameras 22,23 e.g. while simultaneously automatically producing a part program as to the object 15 and the sensor chain 16. Based on these images, recognition of the part 15 and the sensor 16, using the correct part program and checking the alignment of the part 15 is provided.

Figure 3:
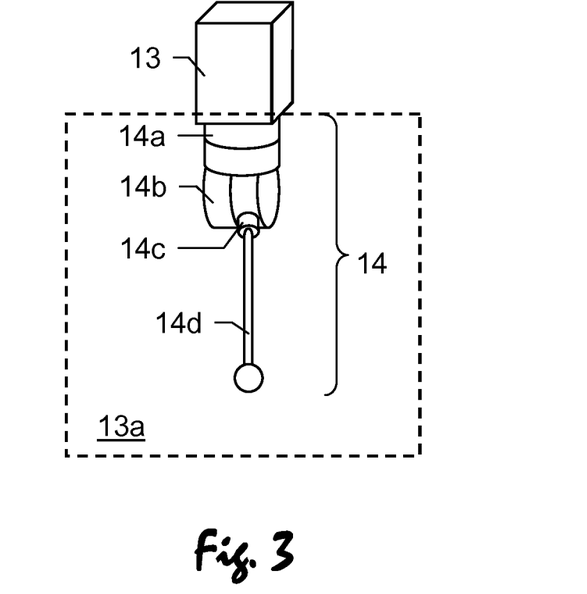
FIG. 3 shows an embodiment of a sensor chain with its sensor chain components.

FIG. 3 shows a tool carrier 13 of a coordinate measuring machine and a sensor chain 14 which is attached to the carrier 13. Furthermore, a sensor carrying zone 13a is illustrated. Such zone 13a is defined by the tool carrier 13, i.e. the location and/or orientation of the zone 13a is not fixed relative to the CMM but may change according to a movement of the tool carrier 13. On the other hand, the zone 13a is well defined regarding its size and shape and regarding its possible orientation and location relative to the tool carrier 13. With other words, a sensor configuration 14 (=sensor chain 14) which is attached to the tool carrier 13 is present within that sensor carrying zone 13a relative to the tool carrier 13 no matter how e.g. the stylus 14d is oriented or what orientation of the sensor configuration 14 is given by the tool carrier 13.

As can be seen from FIG. 3, the sensor chain 14 comprises an arrangement of particular sensor chain components 14a-d. Component 14a is embodied as a first swivelling unit 14a providing a rotatability of the stylus 14d around a first axis, wherein a second swivelling unit 14b provides rotatability of the stylus 14d around a second axis. Moreover, a measuring component 14c is provided for detecting a contact of the stylus 14d with an object to be measured and for generating measuring signals according to the contact.

It is to be understood, that the composition of the shown sensor chain components 14a-d is just one example of how such sensor chain 14 can be implemented. Alternatively, the sensor chain may comprise additional components or one or more of the shown components 14a-d may be replaced by others or excluded from the sensor chain 14. Particularly, the stylus 14d and the measuring component 14c may be replaced by a non-contact probe (e.g. laser scanning unit) in order to provide non-contact measurement of an object.

According to the invention, a camera of the CMM is oriented and/or located so and the tool carrier 13 is moved in a position so that the field of view of the camera overlaps with the sensor carrying zone 13a. Thus, when capturing an image according to that arrangement at least a part of the sensor chain 14 (of the sensor carrying zone 13a respectively) is covered so that this part correspondingly appears in the captured image.

By use of image processing, specific features are extracted from the captured image, the features reference on or represent specific sensor chain components 14a-d. For instance, the shape of at least one component or a code pattern (which is printed on one of the components) is extracted as the specific feature.

In a next step, the extracted features are compared to a reference set of data which contains an amount of available sensor components and which assigns each sensor component to a set of features representing and/or enabling identification of the respective component.

Based on that comparison of the extracted image information with the set of data, corresponding output is generated. Particularly, each attached sensor component 14a-d is identified and a respective type of each sensor component is set as parameter in the controlling unit of the CMM. Moreover, the output may be provided to a user and tells the user about what sensor components are present and the user may be asked for confirmation.

In case one or more components are not identified the user may be asked to select the missing sensor component and to manually put such information into the system.

According to a specific embodiment of the invention, the derived information about the sensor chain components 14a-d is used for later measurements with the chain 14. For instance, a part program may automatically be adapted based on that information and the measurement is performed based on the adapted program.

Figure 4:
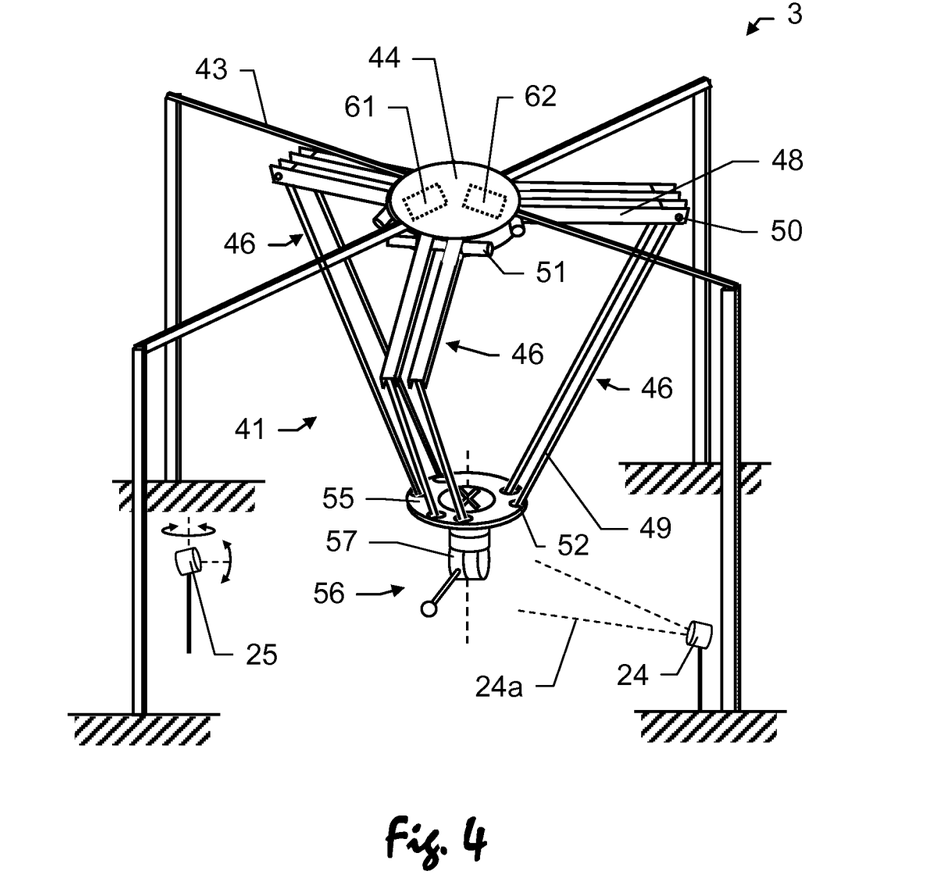
FIG. 4 shows another embodiment of a coordinate measuring machine according to the invention with a delta robot and cameras for capturing an image of the sensor chain.

FIG. 4 shows a coordinate measuring machine 3 (CMM) according to the invention having a Delta Robot 41 as a (supporting) structure.

The Delta Robot 41 comprises a stationary frame 43 supporting a stationary base 44, and three arms 46, also called kinematic chains. The frame 43 is usually a massive construction, but presented here filigree and only schematic in order to show details of the Delta Robot more clearly. Each arm has two parts 48, 49, which are linked by a middle joint 50. The first part 48 of each arm 46 is connected by first joints 51 to the stationary base 44 and with their second parts 49 by second joints 52 to an end effector 55 (tool carrier). The end effector 55 in this case is built in form of a circle like plate supporting a tool or a probe 56 (sensor chain). The end effector 55 is configured in a way that the tools or probes 56 are interchangeable.

In this example a control unit 61 and an analysing unit 62 are arranged in the stationary base 44 of the Delta Robot 41. However, the control unit 61 and an analysing unit 62 can be located externally in a computer as well, which can be connected to the Delta Robot 41 by wired or wireless communication means (not shown). As usual, the joints are provided with angle encoders (not shown) in order to deliver according angle signals, so that the current position of the end effector 55 and of the sensor chain 56 can be derived and used by the analysing unit 62 and the control unit 61. The control unit 61 controls the movement of the end effector 55 with the sensor chain 56 within the motion zone having three degrees of freedom (lateral in x-, y-, z-directions) by means of actuators (not shown) in a known manner by using the signals/data delivered by the angle encoders and particularly by additionally using the signal/data delivered by acceleration sensors for determining the current position of the probe 56 more precisely.

Additionally, an orientation of the sensor chain 56 at the end effector 55 is determinable by corresponding encoders located at pivoting means 57 connecting the probe 20 with the end effector 55.

Of course the CMM 3 is, as known in the state of the art, provided with input means (not shown) and with output means (not shown), e.g. in form of a display or monitor and optionally a loud speaker for acoustic warning connected to the analysing unit 62 for presenting the results to the user. Further as known there is an input means for enabling the user to manipulate the CMM 3. Those means can be integrated in the CMM 3, e.g. in the stationary base 44 or they can be built as an external unit (not shown) or integrated in a computer (not shown) and connected to the CMM 3 by wire or wireless in well-known manner.

The CMM 3 comprises sensor chain identification functionality according to the invention, i.e. two cameras 24,25 are mounted on the CMM 3 (here: the first camera 24 associated to the stationary frame 43 and the second camera 25 insides the measuring volume) for capturing one or more images of the sensor chain 56, in particular of the lower end of the end effector 55. On execution of the functionality—particular by the control unit 61—at least one image of the sensor chain 56 is captured and a sensor feature is extracted from the image by use of image processing (feature extraction). The sensor feature is compared to reference data in a database; the reference data provides assignment of the sensor feature to a known sensor component. Depending on that comparison, an output is generated which provides information about the attached sensor chain 56.

Particularly, the attached sensor components (or the entire sensor chain 56, i.e. each sensor component of the probe 56) are identified.

The information about the chain 56 then may be provided to an operator of the CMM 3 or may be put into the processing (controlling) system in order to plan measuring of an object and/or to configure a respective part program (program which defines the measuring process, e.g. which kind and composition of probe is demanded).

Although the invention is illustrated above, partly with reference to some specific embodiments, it must be understood that numerous modifications and combinations of different features of the embodiments can be made and that the different features can be combined with principles of identification of sensor components and/or coordinate measuring machines known from prior art.

What is claimed is:

1. A method for providing information about a sensor chain of a coordinate measuring machine, the method comprising:
    providing the coordinate measuring machine that is configured to determine at least one spatial coordinate of a measurement point of an object to be measured, wherein the object is not part of the coordinate measuring machine, the coordinate measuring machine comprising:
        a drive mechanism with a motor drive for moving a tool carrier relative to a base for approaching the measurement point of the object to be measured,
        the sensor chain carried by the tool carrier and comprising an arrangement of sensor chain components providing a particular sensor configuration for measuring the measurement point of the object to be measured, and
        a camera aimed at the sensor chain for providing an image of at least a part of the sensor chain;
    capturing an image of at least a part of the sensor chain;
    deriving at least one sensor chain property from the image by image processing;
    comparing the sensor chain property with reference data which relates to a set of known sensor chain components; and
    providing an output relating to the comparison of the sensor chain property with the reference data.

2. The method according to claim 1, further comprising:
    identifying at least one of the sensor chain components by comparing the sensor chain property with the reference data.

3. The method according to claim 2, wherein:
    information about the identified at least one sensor chain component is used for setting up a part program to be run in order to measure the object.

4. The method according to claim 1, further comprising:
    identifying at least one of the sensor chain components by identifying the entire sensor chain.

5. The method according to claim 1, further comprising:
    generating a user information which provides information about at least one of the sensor chain components determined by the comparison of the sensor chain property with the reference data, and
    outputting the user information for guidance of an operator of the coordinate measuring machine, wherein the user information is displayed on display means.

6. The method according to claim 5, wherein:
    the reference data comprises type and state of the sensor chain component.

7. The method according to claim 1, wherein:
    providing the output dependent on a match of the at least one derived sensor chain property with a measurement requirement given by a selected measuring program.

8. The method according to claim 1, wherein:
    the sensor chain property provides dimensional sensor information of the at least one covered part of the sensor chain, wherein the dimensional sensor information is derived at least by use of calibration parameters of the camera.

9. The method according to claim 1, wherein the reference data comprises at least one of:
    reference images of the known sensor chain components;
    codes and/or patterns referencing known sensor chain components; and
    information about at least one known sensor chain component, the information at least representing a type and/or dimensional reference information of the known sensor chain component.

10. The method according to claim 1, further comprising:
    capturing a further image with the camera covering at least a part of a measuring volume within which the object to be measured is mountable, deriving object information based on the captured further image and providing the object information for checking presence of the object and/or identifying the object, wherein dimensions of the object and/or an object type are determined.

11. The method according to claim 10, wherein:
the object information is used for controlling a measuring process, wherein
a movement of the sensor chain is controlled so that a collision of the sensor chain with the object is prevented and/or
a measuring path is adapted based on the object information.

12. The method according to claim 1, further comprising:
capturing a further image with the camera covering at least a part of a measuring volume within which the object to be measured is mountable,
deriving object information based on the captured further image and
providing the object information for checking presence of the object and/or identifying the position and/or orientation of the object with reference to the measuring volume, wherein dimensions of the object and/or an object type are determined.

13. The method according to claim 1, wherein:
an image signal is continuously provided by the camera representing image information according to the field of view of the camera, wherein the image signal is continuously processed regarding possible changes concerning the image information, for determining motions in the field of view and for controlling the measuring process dependent on the determined motions.

14. The method according to claim 1, wherein only one first image of the at least a part of the sensor chain is captured and used for deriving the at least one sensor chain property by the image processing.

15. A coordinate measuring machine configured to determine at least one spatial coordinate of a measurement point of an object to be measured, wherein the object is not part of the coordinate measuring machine, the coordinate measuring machine comprising:
a tool carrier being adapted to carry a sensor chain so that the sensor chain—in an attached state—is present within a sensor carrying zone with reference to the tool carrier, the sensor chain comprising an arrangement of sensor chain components providing a particular sensor configuration for measuring the measurement point of the object to be measured;
a structure, to which the tool carrier is attached, the structure being movable in at least two directions;
a drive mechanism with a motor drive for moving the tool carrier relative to a base for approaching the measurement point of the object to be measured;
a controlling and processing unit; and
a camera aimed at the sensor carrying zone for providing an image of at least a part of the sensor carrying zone; wherein:
the camera and the tool carrier are adapted to be positioned and/or oriented relative to each other so that the field of view to the camera at least partly overlaps with the sensor carrying zone,
reference data relating to a set of known sensor chain components is provided in a database, and
the coordinate measuring machine provides a sensor identification functionality executable by the controlling and processing unit and at least defined by:

capturing an image of at least a part of the sensor carrying zone,
deriving at least one sensor chain property from the image of the part of the sensor carrying zone by image processing,
comparing the sensor chain property with the reference data and
providing an output relating to the comparison of the sensor chain property with the reference data.

16. The coordinate measuring machine according to claim 15, wherein:
the camera being arranged at the structure or at the base of the coordinate measuring machine, particularly wherein the structure comprises a portal being moveable in a first direction with two portal legs and a bridge and a column provided at the portal and being moveable in a second direction perpendicular to the first direction.

17. The coordinate measuring machine according to claim 15, further comprising a second or more camera, wherein
additional images each at least covering a part of the sensor carrying zone are capturable with the second or more cameras and
the sensor identification functionality is configured so that the additional images are used for deriving the at least one sensor chain property.

18. The coordinate measuring machine according to claim 15, wherein the sensor identification functionality is configured so that:
a digital model is generated based on the image and/or the second or more images and the digital model being provided for identification of the at least one sensor chain component.

19. The coordinate measuring machine according to claim 15, wherein the sensor identification functionality is configured so that:
depending on the derived sensor chain property, the relative position and/or orientation of the camera and the tool carrier is rearranged and another image is captured which is used for deriving the at least one sensor chain property, particularly wherein a kinematical model of the sensor chain is derived.

20. The coordinate measuring machine according to claim 15, wherein the controlling and processing unit executes a method comprising:
capturing an image of at least a part of the sensor chain;
deriving at least one sensor chain property from the image by image processing;
comparing the sensor chain property with reference data which relates to a set of known sensor chain components; and
providing an output relating to the comparison of the sensor chain property with the reference data.

21. The coordinate measuring machine according to claim 15, wherein only one first image of the at least a part of the sensor carrying zone is captured and used for deriving the at least one sensor chain property by the image processing.

22. One or more non-transitory computer-readable media storing one or more programs that are configured, when executed, to cause one or more processors to execute a method for providing information about a sensor chain of a coordinate measuring machine that is configured to determine at least one spatial coordinate of a measurement point of an object, wherein the object is not part of the coordinate measuring machine, the method comprising:
aiming a camera at a sensor chain of the coordinate measuring machine;

capturing, with the camera, only one first image of at least a part of the sensor chain of the coordinate measuring machine;

deriving at least one sensor chain property from only the one first image by image processing;

comparing the sensor chain property with reference data which relates to a set of known sensor chain components; and providing an output relating to the comparison of the sensor chain property with the reference data.

* * * * *